Nov. 28, 1967    D. J. ANDERSON    3,354,989

OIL COLLECTOR AND PROJECTING MAGNETIC RETENTION MEANS THEREFOR

Filed Aug. 30, 1965

United States Patent Office 3,354,989
Patented Nov. 28, 1967

3,354,989
OIL COLLECTOR AND PROJECTING MAGNETIC RETENTION MEANS THEREFOR
Donald J. Anderson, Neenah, Wis., assignor to Kimberly-Clark Corporation, Neenah, Wis., a corporation of Delaware
Filed Aug. 30, 1965, Ser. No. 483,506
5 Claims. (Cl. 184—106)

ABSTRACT OF THE DISCLOSURE

An oil collector for attachment to equipment to retain oil dripping from the equipment. The collector includes a container having magnetic retention means which extend above the container and a replaceable filling of oil absorbent material in the container. The magnetic means are adapted to retain the container in spaced relation with magnetically responsive housings of equipment from which oil leakage may occur. The magnetic means may be rockably mounted on the container and the container may be distortable by manual pressure to accommodate the collector to equipment contours. The oil absorbent material may extend above the open top of the container to be compressed when in position for use on equipment.

---

This invention relates to a device especially adapted for use in maintaining areas such as garage floors, driveways, factory flooring and the like free of oil from equipment leaks. Such may be the engines, transmissions, differentials and the like of automotive vehicles or stationary apparatus, for example, the gear boxes of chain hoists.

While not so limited, the invention has particular application to automobiles and the maintenance of home, garage and driveway areas free of oil drippings. A device is contemplated for such use which is readily positioned on even the more difficulty accessible parts of an automotive vehicle. The preferred use of the device is to position it centered over a zone on the equipment from which dripping takes place. This is usually a low spot or protrusion on the bottom of a machine or equipment housing. At such low spots oil commonly collects prior to dripping and only a small area need be covered by the device to effectively eliminate the oil drip. It is essential, however, that there be little or no interference caused by the device with the oil movement to the low spot. The present invention effects this object well.

A further object of the invention is the provision of a device which serves as an oil collector and which is adapted to conform well to a variety of shapes of machine housings and yet which retains its structural integrity in use.

An important object of the invention is to provide an automotive oil collector which is resistant to the takeup or accumulation of water which may tend to be splashed against the underside of the vehicle and the collector.

Yet another object of the invention is to provide an oil collector which has a readily replaceable inexpensive oil collecting element in the form of an oil absorbent mass of material.

The invention will be more fully understood by reference to the following detailed description and accompanying drawings wherein.

Figure 1:
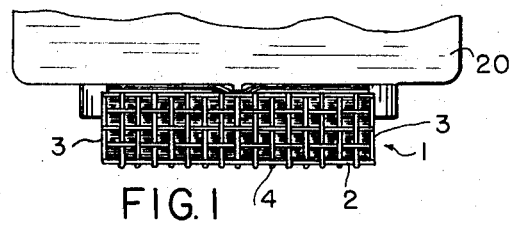
FIG. 1 is a fragmentary view of an automobile housing with a preferred construction of the device of invention in position to collect oil and prevent oil drip from the vehicle.
Figure 2:
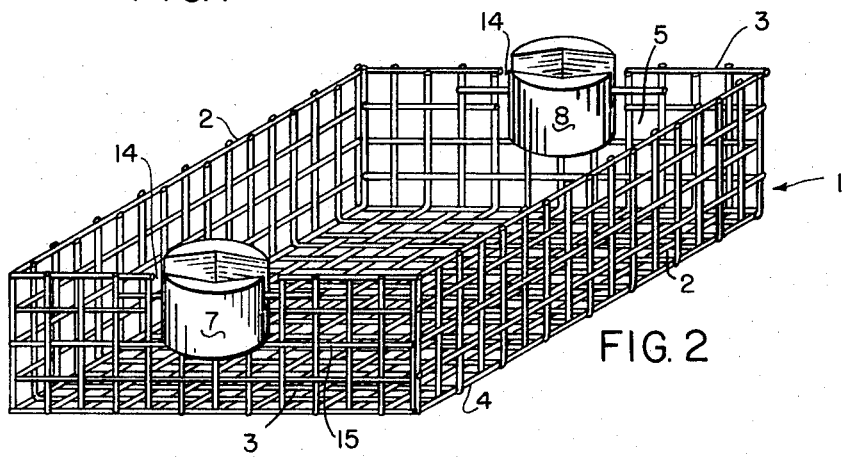
FIG. 2 is a perspective view of the device of FIG. 1 with the oil-absorbent material removed.

Referring to the drawings and initially, particularly, FIGS. 1 to 6 inclusive: the numeral 1 designates an open mesh basket having opposed lateral sides 2, opposed end sides 3 and a bottom 4. The top 5 is open. This basket is generally rectangular and of a size such that it may be readily held in the hand. The material of the mesh housing the basket is preferably galvanized metal of conventional screen type, the openings being about 4 to the inch. The basket may be of any suitable oil resistant material including plastic; where the application is to be such that the basket will be exposed to heat, as in automobile engines, the basket material should be heat resistant. A feature of the basket is that it is semi-rigid, that is, it may be distorted to some degree by manual pressure to conform closely to a contoured surface. The open mesh permits water splashed on the basket to drain readily as the filling 6 of the basket is suitably water resistant. The basket may be closed on the bottom or sides if drainage is provided through either the bottom or sides or by openings at the juncture of the two. The basket need not have a rectangular configuration but may be cylindrical, for example.

The filling 6 is an oil-absorbent material, for example, cellulosic wadding in layered form, or it may be fluff. If desired, shredded or granular material may be used, provided the basket is selected to suitably retain the smaller sized material. Wadding or fluff which has been treated in known manner with water-repellent agents such as the alkyl ketene dimers serve the purpose well. One commercial form of such agent is marketed under the trademark "Aquapel" by the Hercules Powder Company, Wilmington, Del. Other agents commonly employed for paper sizing and textile treatments are similarly useful to prolong the life of the material 6. The compressibility of the oil-absorbent material is not significantly affected by such treatment. Like the basket, the absorbent material should be able to withstand the temperature of the surface which it contacts without significant deterioration.

Figure 3:
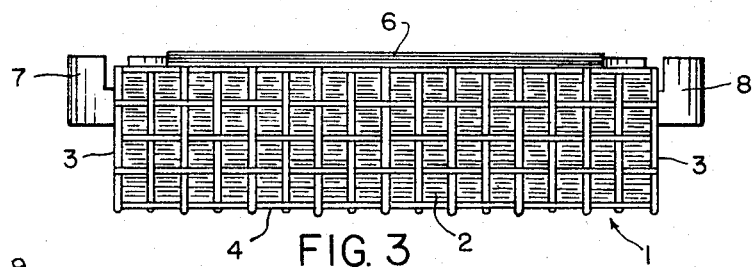
FIG. 3 is an enlarged side view of the device of FIG. 1 including the oil-absorbent material.
Figures 4, 5:
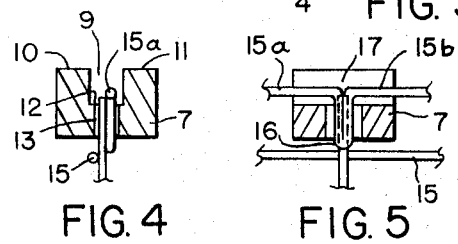
FIG. 4 is a fragmentary view partially in section illustrating the mounting of the magnets of FIGS. 2 and 3.
FIG. 5 is a view taken at a right angle to that of FIG. 4.

Preferably, as shown in FIG. 3 particularly, the absorbent material completely fills the basket, extends above the level of the sides, and, when pressed against a surface, is compressed. This compressibility is particularly advantageous in several respects. First, it permits the device to be mounted over protrusions and, also, it provides for a relatively large area of contact between the wadding and a housing surface.

The basket and absorbent material are adapted with magnet means 7, 8 for retaining the device in position against a surface from which oil is to be absorbed. Magnet means 7, 8 are preferably similar and similarly mounted in opposing relation on the enclosing side means of the basket and project above the side means to space the side means from a magnetically responsive housing to which the basket may be applied.

Figure 6:
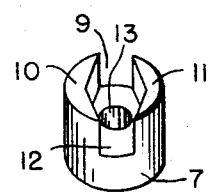
FIG. 6 is a view of one of the magnets.

Referring particularly to FIG. 6 and the specific magnet structure, the magnet 7 is generally cylindrical and slotted through at 9. The opposed poles 10, 11 of the magnet bound the slot 9 and, accordingly, extend above the base portion designated at 12. This base portion 12 is provided with a centrally disposed aperture 13 which passes completely through the base portion.

The magnet is carried by the basket 1 in such manner that the magnets may rock or pivot inwardly and outwardly relative to the basket. Such facilitates mounting of the device on uneven or contoured surfaces and assures of close conformance of the magnet with a surface. As shown in FIGS. 2–5 inclusive, the basket is cut out at 14 to accommodate the magnet 7, and the magnet is engaged and supported by a transversely extending wire 15 of the basket. A vertically extending wire 16 projects upwardly from the wire 15, passes freely through the aperture 13, and is secured to an upper transversely extending wire 15. For purposes of mounting the magnet, the wire 15 may be cut into parts 15a, 15b and then soldered together at juncture 17 with the vertically extending wire 16. The free passage of the wire 16 in the aperture 13 and the free passage of the wire 15 through the slot 9 provides for a limited rocking motion of the magnet relative to the basket. In use the upper wire 15 is engaged by the magnet. Magnet 8, as already noted, is similarly mounted and, accordingly, such need not be described in detail. The magnet strength may vary depending upon the particular service to which the device is directed. It has been found, for example, that, when attached to the differential housing of an automobile, somewhat greater magnetic capacity is desirable than when the attachment is to the engine block or transmission. The device has, however, proved itself thoroughly reliable and efficient in automotive service.

The magnets retain the device well positioned on a casing such as is generally illustrated at 20 in FIG. 1. When the wadding projects above the basket to at least about the level or just above the level of the magnets, it compresses and for this reason accommodates itself well to casing protrusions and the like. Additionally, a relatively large area of casing is covered by the wadding, and there is substantially no interference with the oil flow to the wadding. Also, the wadding in contact with the magnetically responsive housing may serve to cushion the device against shock.

The container for the wadding is preferably a basket. Such is not necessary, however. The bottom may be solid at the expense of flexibility usually, but the entry to the wadding of road dirt is then inhibited. The basket mesh form provides the required drainage openings for water elimination, permits the wadding to retain its general shape and protects the wadding against damage from mechanical action as well as water and windage on automotive vehicles. The relative rocking action between the magnets and basket aids materially in positioning the basket and also in absorbing vibrations which might otherwise shake the basket loose in use. Importantly, due to the close spacing of the basket in use, the usual flow of oil to a low point on a housing is not redirected by the basket—only the relatively small area of the magnets would thus interfere, and the magnets usually may be positioned to avoid this. The spacing between the basket and the magnetically responsive housing need only be vey small—sufficient not to interrupt the usual thin film of oil by the basket structure.

Particular advantages derived from the use of the device are cleanliness and safety, the safety resulting from the elimination of slick oil spots in frequently traversed areas such as garages, driveways, walk areas and the like. The size of the device is conveniently small, that is, it is readily retained in the hand and is therefore suitable for easy mounting in position. This aids in eliminating the necessity for raising an automotive vehicle for mounting of the device.

It will be understood that this invention is susceptible to modification in order to adapt to different usages and conditions and, accordingly, it is desired to comprehend such modifications within the invention as may fall within the scope of the appended claims.

What is claimed is:

1. An oil collector comprising a container having drainage openings and being of a material which is distortable by hand and resistant to oil, said container including side means, a bottom and an open top, a filling of an oil-absorbent material in said container, and permanent magnet means secured to said side means projecting above the open top and the side means for supporting the container from a magnetically responsive housing in spaced relation with the housing.

2. An oil collector comprising a container having drainage openings and being of a material which is distortable by hand and resistant to water and oil, said container including side means, a bottom and an open top, a filling of a compressible oil-absorbent, water-repellent material in said container extending above the said side means, and permanent magnet means secured to said side means projecting above the open top and the side means, said compressible material extending above the side means at least to the level of the magnet means.

3. An oil collector comprising a container having drainage openings and being of a material which is distortable by hand and resistant to water and oil, said container including side means, a bottom and an open top, a filling of an oil-absorbent, water-repellent material in said container, and permanent magnets secured to said side means projecting above the said side means for supporting the container from a magnetically responsive housing in spaced relation with the housing, at least one of said magnets being rockably carried by said side means for relative rockable movement of the container and one said magnet.

4. An oil collector comprising a basket of semi-flexible open mesh material including side means, an open top and a bottom, said basket being distortable by hand pressure, a filling of an oil-absorbent, water-repellent material in said basket, and a pair of permanent magnets secured to said side means, said permanent magnets each being rockably carried by said side means and projecting above the said side means for suspending the said basket in closely spaced relation with a magnetically responsive housing.

5. An oil collector comprising an open mesh basket of semi-rigid material which is distortable by the pressure of the hand, including side means, an open top and bottom, a filling of an oil-absorbent compressible and water-repellent material in said basket extending above the said side means, and permanent magnets secured to said side means in oppositely disposed relation, said permanent magnets being rockably carried by said side means and projecting above the said side means for rockably suspending said basket in spaced relation with a magnetically responsive housing, said oil-absorbent, compressible water-repellent material also extending above the side means at least to the level of the magnet means.

References Cited
UNITED STATES PATENTS

| | | | |
|---|---|---|---|
| 1,163,317 | 12/1915 | Brush | 180—69.1 |
| 2,727,650 | 12/1955 | Moynihan et al. | |
| 2,783,848 | 3/1957 | Beskid | 180—69.1 |
| 2,899,019 | 8/1959 | Colgan | 180—69.1 X |
| 2,931,453 | 4/1960 | Inglese | 180—69.1 |

BENJAMIN HERSH, *Primary Examiner.*

MILTON L. SMITH, *Examiner.*